United States Patent [19]

Koromzay

[11] Patent Number: 4,841,117
[45] Date of Patent: Jun. 20, 1989

[54] METHOD FOR LENGTHENING THE BLADING AEROFOIL OF TURBO MACHINERY BLADES

[75] Inventor: Tibor Koromzay, Wettingen, Switzerland

[73] Assignee: BBC Brown Boveri AG, Baden, Switzerland

[21] Appl. No.: 128,170

[22] Filed: Dec. 3, 1987

[30] Foreign Application Priority Data

Dec. 12, 1986 [CH] Switzerland .................. 4952/86

[51] Int. Cl.$^4$ ............................................. B23K 9/04
[52] U.S. Cl. ................................ 219/76.1; 416/213 R
[58] Field of Search ............... 416/213 R; 219/76.1, 219/76.12, 76.15

[56] References Cited

U.S. PATENT DOCUMENTS 4,292,010  9/1987  Meetham et al. ............... 416/213 R

FOREIGN PATENT DOCUMENTS 2054549  5/1972  Fed. Rep. of Germany .
2397259  2/1979  France .
59-10471  1/1984  Japan .................................. 219/76.1

Primary Examiner—E. A. Goldberg
Assistant Examiner—Donovan
Attorney, Agent, or Firm—Burns, Doane, Swecker & Mathis

[57] ABSTRACT

In this method of lengthening the blade aerofoil (5) of turbo machines by building up with weld in the assembled condition of the blades, the position (4) to be welded at the end of the blade aerofoil (5) is encased by a metal mold (1,2). The mold (1,2) has a connection (3) where one pole of the welding circuit is connected. The end (4) of the blade aerofoil is lengthened or repaired by applying runs of weld. The mold (1,2) can be optionally supplemented with heating and/or cooling arrangements and also with a protective gas supply.

7 Claims, 2 Drawing Sheets

METHOD FOR LENGTHENING THE BLADING AEROFOIL OF TURBO MACHINERY BLADES

TECHNICAL FIELD

The invention concerns a gauge for putting into order defective blading aerofoils of turbo machinery blades which suffer defects for any reason during operation. In particular, the invention concerns a method—and a device for carrying out this method—for lengthening and/or repairing (improving), for example, corners at the inlet and outlet edges of the blade aerofoil of turbo machinery blading by building-up with weld metal.

DESCRIPTION OF RELATED ART

In turbo machines, for example, turbines, defective blades represent a great danger potential to the whole installation. It is generally agreed that the difficult part of any blade is the blade aerofoil, especially where expansion of low pressure turbines are concerned, in which relatively slender blading aerofoils are encountered.

Damage to the blading aerofoils is unavoidable due to blading vibrations, the occurrence of unbalance or a non-central bearing position of the rotor due to wear when efforts are made to minimize the air gap between the end of the blading aerofoil and stator. Cases in which replacement of the complete blade is necessary because of such a defect are rare. In most cases, the blading aerofoils suffer length wear or upsetting due to rubbing in the hot environment and as a result, the gap between the end of the blading aerofoil and the stator is then increased due to one-sided bearing support beacuse of the running eccentricity of the rotor. Such increases in gaps reduce the efficiency of the installation and disturb the flow of the medium in such a way that the running properties of the turbo machine can move in the direction of an unstable condition. Particularly where the wear of the blading aerofoil becomes more advanced, this can lead to a dynamically deteriorating irreversible condition.

In the usual manual operation, the repair of the blade in introduced in such a way that it is built up, i.e., that the blade or the end of the blade aerofoil is possible preprepared metallurgically and subsequently brought to the original length by building-up with weld metal, which—on the basis of a rotor aligned anew to concentric running—reproduces the optimum air gap between the end of the blade aerofoil and the stator. Such a procedure also achieves the objective but the expense involved is very large. In addition, when the rotor is refitted with the blades, insertion errors of individual blades can occur which always makes rework necessary—as is known from practice. Seen from this point of view, it is obvious that length matching and/or small repairs to the ends of the blade aerofoils in the assembled condition is a desirable objective, i.e. after concentricity alignment of the rotor, the minimizing of the air gaps or blade clearances between the ends of the blade aerofoils and the stator is again established. Simply applying this technique, advantageous from the point of view of expense, introduces some important disadvantages. In the first place, mention should be made of the possibly long current return path leading via the rotor. For electro-technology reasons, it is advantageous that the current circuit should be as short as possible when welding and that the location of the current supply should be near the welding position. If a clamp is directly applied to the blade aerofoil, the latter can be damaged mechanically or due to sparks jumping across. Such notches, particularly those which occur due to electrical burning, greatly reduce the fatigue strength of the blades.

In the case of materials with a tendency to hot cracking, this tendency can be reduced by reducing the supply of heat and heating the welding zone. In other words, rapid removal of the heat from the welding position has a positive effect.

This desirable rapid cooling of the blades after the welding process is inadequately ensured without additional expensive aids. Unprofessional makeshift cooling of the blades does not lead to the desired success—as shown by experience. On the other hand, what has been stated—although with the opposite sign—applies in the case of blade materials which demand preheating and subsequently even temperature gradients during welding. In this case, it is quite impossible to build up by welding to a high quality level without additional arrangements, which are again expensive and for which the material requirements are not always available, particularly when the repair has to be carried out at the installation site. With respect to the quality of the welding, it is no longer possible to manage without an additional supply of inert gas (protective gas) in the welding area of the blades in the case of sensitive blade materials. If such a protective measure is to be additionally provided, however, this means that further special arrangements have to be made and these again increase the expense to a not insubstantial extent.

SUMMARY OF THE INVENTION

The invention achieves the objective of providing a method of lengthening the blade aerofoil and/or repair of the ends of the blades of turbo machine blading by building-up with weld metal in the assembled condition, in which method the expense of doing this is minimized and the quality assurance of the welding is increased to the greatest possible extent.

The advantages of the method according to the invention may be seen essentially in the fact that the blading aerofoils can be lengthened to any given extent by building up with weld metal in the installed condition and also on site, the welding method used here including measures which permit advanced welding.

The metal mold forms an integrating measure of the method according to the invention. Further advantageous embodiments of the mold and of the welding method permit the objective set to be achieved. The mold itself, which is preferably designed in two pieces, has a through opening of the shape of the profile of the blade aerofoil on the inside. It is also employed in the region of the end of the blade aerofoil in such a way that it surrounds and encases the profile shape of the blade aerofoil like a sleeve. By this means, it is easy to attach one pole of the welding circuit directly to the mold so that the current paths can be reduced to a minimum. Such a mold also offers the possibility of providing heating and cooling arrangements—acceleration of the cooling in the case of materials sensitive to hot cracking or nickel alloys for example. In the case of materials which require preheating for welding, this can be achieved by the supply of heat in the form of even heating. By heating the mold to relatively high temperatures, annealing or short-term stress relieving is possible, in the case of ferritic/martensitic materials for example.

It is obvious that the scavenging of the end of the blade aerofoil with protective gas, which can screen sensitive blade materials against the effects of gases from the atmosphere, can be achieved by appropriate design of the mold, for example by arranging a system of supply holes or ducts, or the insertion of a porous intermediate layer between the mold and the blade aerofoil. A similar effect to that obtained above can be achieved by providing the end surface of the mold, i.e., the welding position end, with pocket-shaped depressions around the profile of the blade aerofoil.

BRIEF DESCRIPTION OF THE DRAWINGS

Embodiment examples of the invention are explained below using the drawings.

DETAILED DESCRIPTION OF THE PREFERRED EMBODIMENTS

Figure 1:
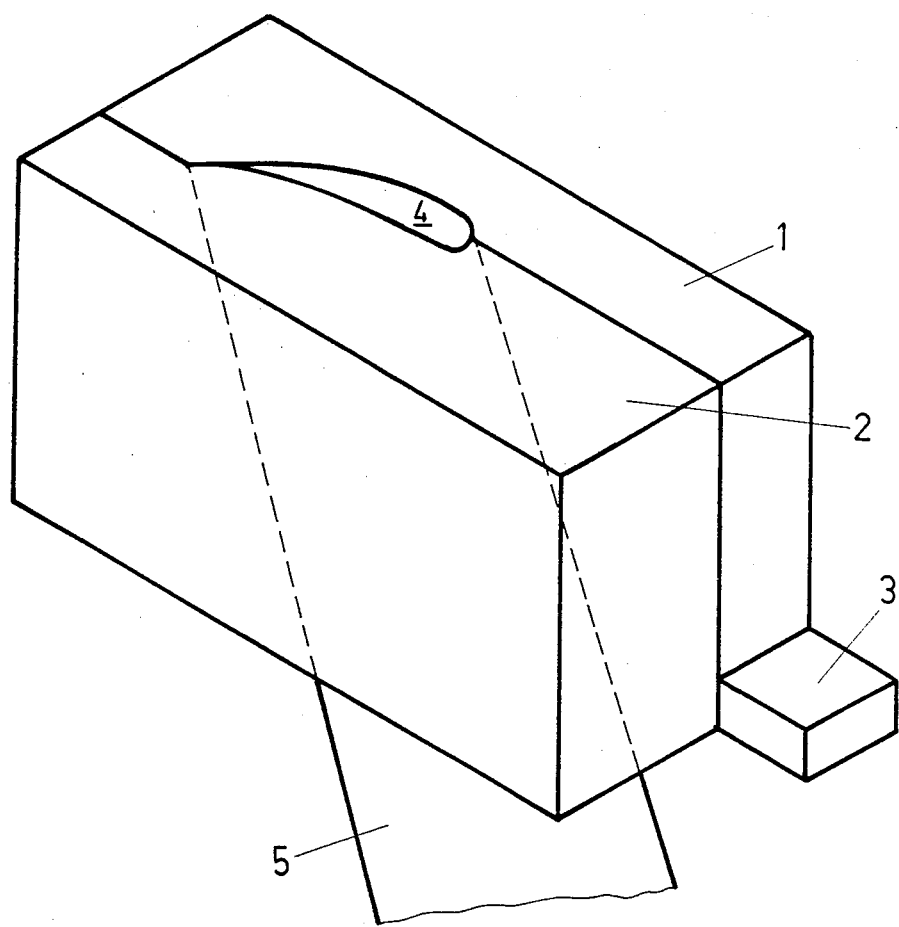
FIG. 1 is a view of a two-part mold as a measure for the method of lengthening the blade aerofoil of turbo machinery blades by building up with weld metal.

As may be seen from FIG. 1, the mold, which is employed as the integrating measure for the method of lengthening the blade aerofoil of turbo machinery blades by building up with weld metal, consists of two parts 1, 2 which can be placed together. Mold part 1 carries a bracket or connection 3 to which is connected one pole of the welding circuit. By this means, this arrangement ensures a short current supply path and a good electrical contact by means of which damage to the blade by lack of care in attaching the welding cable can be avoided. The two mold parts 1, 2 are put together and fixed by using a releasable connection. The mold 1, 2 has, on the inside, a through opening 4 of the shape of the profile of the blade aerofoil 5. The material of the mold is preferably copper. If, for example, a blade aerofoil of a gas turbine rotor blade in the material IN 738 LC is to be lengthened, the TIG method is used for welding, for which 60-80 A, 5-7 Volt, protective gas argon 6-10 l/min are to be fixed as the welding parameters.

One to three runs of weld are then applied to the end surface of the blade aerofoil 5. The additive wire is preferably 1.2 mm thick and consists of a suitable nickel alloy, for example IN 625 or IN 617.

It is obvious that more than three runs of weld can also be applied. If the air gap is large, in consequence, the whole of the end surface of the blade aerofoil should be built up to provide better stability of the material welded on.

Figure 2:
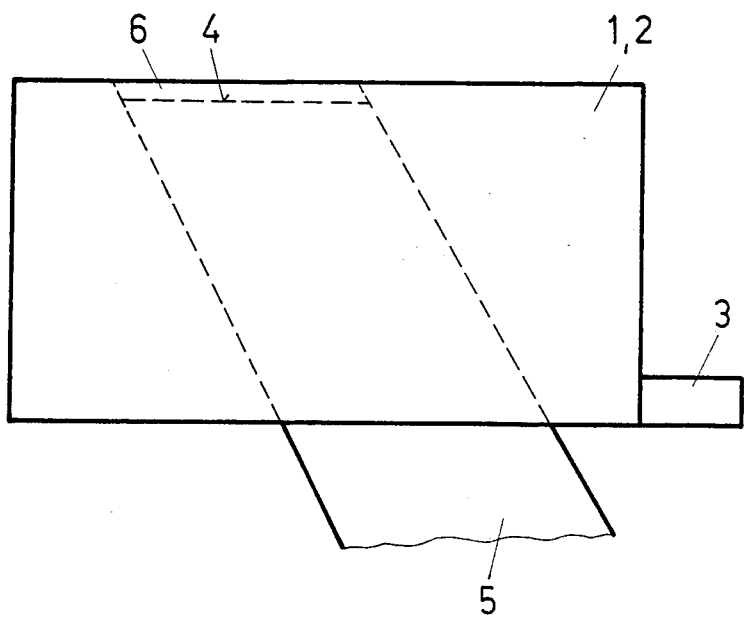
FIG. 2 is a view of another mold with pocket-shaped depressions.

FIG. 2 shows an arrangement of how the improvement to the gas protection in the region of the end of the blade aerofoil 4 can be achieved. So that the upper edge of the mold 1, 2 protrudes beyond the end of the blade aerofoil, there is a depression 6 at this point. The protection may be here seen in that screening against the effect of gases from the atmosphere is provided by this means. Such an arrangement is obviously only suitable where only a minimum lengthening of the blade aerofoil is required.

Figure 3:
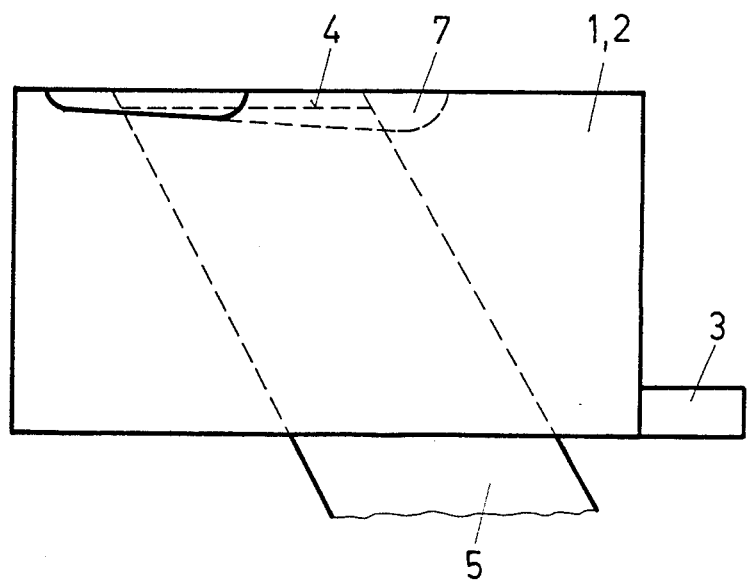
FIG. 3 is a view of another mold in which the depression is achieved by placing the end of the blade aerofoil lower.

FIG. 3, on the other hand, shows a possibility of how the protection against the effect of gases from the atmosphere can be arranged more effectively. Protective pockets 7 are created around the profile of the blade aerofoil 5. The air is displaced from this region by convection during the welding procedure. In addition, more working freedom is available when building up the weld. This is also suitable for building up by weld when the whole of the profile has to be renewed. The contour of the pocket is then appropriately wider than the profile.

None of the examples show how the mold 1, 2 can be supplemented by heating and/or cooling arrangements. Heating can, for example, occur by induction and cooling by the recirculation of a medium. The example of a compressor rotor blade in 12% chromium steel shows how important the heating of the welding part is. In this case, the mold must be heated to 300° C. if damage to the blade aerofoil, due to cracking, for example, is to be avoided during welding. On the other hand, cooling must be provided in the case of a nickel alloy, for example.

The supply of protective gas into the weld part of the blade by an arrangement of a system of supply holes or ducts is not shown either. It is also possible to provide a porous intermediate layer between the mold 1, 2 and the blade aerofoil 5. By this means, welding under a protective gas is made completely possible.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. A method for lengthening the blade aerofoil of turbo machine blades by building up weld metal thereon, the blade aerofoil having any given profile and the method being carried out on assembled blades, the method comprising the steps of:

encasing the portion of the blade aerofoil to be welded in a metal mold matched to the profile of the blade aerofoil and which metal mold extends beyond the end surface of the blade aerofoil thus forming a depression defined by the end surface of the blade aerofoil and the inside surfaces of the mold, the recess providing screening against air flowing into the mold, the end surface of the blade aerofoil being freely accessible; and applying at least one layer of weld material to the end surface of the blade aerofoil.

2. Method as claimed in claim 1, wherein the step of applying weld material is effected with the employment of inert gas.

3. Metal mold as a device for carrying out the method as claimed in claim 1, wherein the mold is in two parts, one pole of a welding circuit being directly attached to the mold.

4. Mold as claimed in claim 3, wherein the mold is heated by means of a separate heating device.

5. Mold as claimed in claim 3, wherein the mold has connections for the supply of inert gas, the latter being guided by ducting to the portion of the blade.

6. Mold as claimed in claim 3, wherein the mold is provided on the weld side with protective pockets around the profile of the blade aerofoil.

7. Mold as claimed in claim 3, wherein the mold is cooled by means of a separate cooling device.

* * * * *